(12) United States Patent
Uesusuki

(10) Patent No.: US 11,623,992 B2
(45) Date of Patent: Apr. 11, 2023

(54) FLAKY TITANATE AND METHOD FOR PRODUCTION THEREOF, AND USE THEREOF

(71) Applicant: ISHIHARA SANGYO KAISHA, LTD., Osaka (JP)

(72) Inventor: Yusuke Uesusuki, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 169 days.

(21) Appl. No.: 16/966,915

(22) PCT Filed: Feb. 13, 2019

(86) PCT No.: PCT/JP2019/004978
§ 371 (c)(1),
(2) Date: Aug. 3, 2020

(87) PCT Pub. No.: WO2019/159923
PCT Pub. Date: Aug. 22, 2019

(65) Prior Publication Data
US 2021/0047517 A1  Feb. 18, 2021

(30) Foreign Application Priority Data
Feb. 16, 2018  (JP) .............................. JP2018-025821

(51) Int. Cl.
| | |
|---|---|
| C09C 1/36 | (2006.01) |
| C09D 7/40 | (2018.01) |
| C09D 7/62 | (2018.01) |
| C09D 11/037 | (2014.01) |
| C09D 17/00 | (2006.01) |
| C09D 183/08 | (2006.01) |
| C08K 3/22 | (2006.01) |

(52) U.S. Cl.
CPC .................. *C09C 1/36* (2013.01); *C09D 7/62* (2018.01); *C09D 7/70* (2018.01); *C09D 11/037* (2013.01); *C09D 17/007* (2013.01); *C09D 183/08* (2013.01); *C01P 2004/20* (2013.01); *C01P 2006/62* (2013.01); *C08K 2003/2237* (2013.01)

(58) Field of Classification Search
CPC .......................... C09C 1/36; C08K 2003/2237
See application file for complete search history.

(56) References Cited

U.S. PATENT DOCUMENTS

| | | | | |
|---|---|---|---|---|
| 8,088,212 B2* | 1/2012 | Bagala, Sr. | .......... | A61K 8/0266 |
| | | | | 106/436 |
| 8,617,646 B2* | 12/2013 | Sexton | ................... | C09D 11/17 |
| | | | | 524/270 |
| 9,249,166 B1 | 2/2016 | Nyman | | |
| 2004/0234447 A1 | 11/2004 | Inubushi | | |
| 2008/0210906 A1 | 9/2008 | Kawazu | | |
| 2010/0243968 A1 | 9/2010 | Taniguchi | | |
| 2020/0369891 A1* | 11/2020 | Hamm | ...................... | C09D 7/62 |

FOREIGN PATENT DOCUMENTS

| | | |
|---|---|---|
| JP | 2006-206841 | 1/2006 |
| JP | 2006-257179 | 3/2006 |
| JP | 2008-247712 | 10/2008 |
| JP | 2013-184883 | 9/2013 |
| JP | 2015-007173 | 1/2015 |
| WO | 2003/016218 | 2/2003 |
| WO | WO-2015090500 A2 * | 6/2015 ........... A61K 8/0254 |

OTHER PUBLICATIONS

Search Report issued in PCT/JP2019/004978, dated Apr. 23, 2019, translation, pp. 1-2.
Written Opinion issued in PCT/JP2019/004978, dated Apr. 3, 2019, pp. 1-5.
Sukpirom, N. et al., "Rapid exfo liation of a la yered titanate by ultra sonic pro cess ing", Materials Science and Engineering: A, Nov. 9, 2001, vol. 333, pp. 218-222, in particu lar, see "2. Exp erimenta l", abstra ct, p. 220, right co lumn, lines 28-37, fig. 1, 4.
Geng, F. et al., Gigantic Swelling of Inorganic Layered Materials: A Bridge to Molecularly Thin Two-Dimensional Nanosheets, Journal of the American Chemical Society, Mar. 17, 2014, vol. 136, pp. 5491-5500.
Extended European Search Report issued in corresponding European Patent Application 19753797.0, dated Oct. 26, 2021, pp. 1-8.
Office Action corresponding Chinese Patent Application 201980013762. 6, dated May 29, 2020, pp. 1-8, translation pp. 1-11.
Solvent-based Coating Production Processes, Lee, Production and Application of Modem Coatings, 2nd Edition, Shanghai Scientific Technical Literature Publishers, pp. 273-285, Mar. 31, 2017 (discussed in the Chinese Office Action), translation of relevant parts included.
Office Action corresponding Japanese Patent Application 2020-500499, dated Oct. 4, 2022, pp. 1-5, translation pp. 1-7.
The difference between the number distribution and mass (volume) distribution in the measurement of particle size, MICROTAC MRB web site, [online], [search], [search], Internet < URL:https://microtrac. com/jp/applications/knowledge , and Internet <26 Reiwa 4(2022)—base/difference / mass-distribution /> pp. 1-2.

* cited by examiner

*Primary Examiner* — Vickey Nerangis
(74) *Attorney, Agent, or Firm* — Jeffrey S. Melcher; Melcher Patent Law PLLC

(57) ABSTRACT

Provided is a flaky titanate that exhibits a high weathering resistance while at the same time having the ability to endow a coating film with a silky feeling having a shading feeling and a strong luster feeling, and a method for the production thereof suitable at least for inexpensive industrial production. The flaky titanate contains a basic organic compound wherein the content of basic functional groups thereof is not more than 2.4%, and provides a coating film having a goniospectrophotometric color measured value $\Delta L^*$ of at least 150. The method for producing a flaky titanate contains a step of classifying a flaking titanate having a basic organic compound at the surface and/or in interlayer position, to bring (D90−D10)/D50 in the volume particle size distribution to 1.5 or less.

16 Claims, No Drawings

FLAKY TITANATE AND METHOD FOR PRODUCTION THEREOF, AND USE THEREOF

TECHNICAL FIELD

The present invention relates to a flaky titanate, a method for producing the same, and use thereof, and specifically relates to a luster pigment, a dispersion liquid, and a resin composition, each including the flaky titanate.

BACKGROUND ART

A luster paint film including a luster pigment has been known to give design features on the surface of an article. Conventionally, a luster pigment including a titanium oxide layer provided on the surface of a scaly substrate, such as natural mica, synthetic mica, and scaly alumina, has been used in various fields. Such a conventional luster pigment has a strong luster feeling (here, the "luster feeling" refers to a luster giving a metallic tone.) together with a particle feeling (here, the "particle feeling" refers to a design that appears as if each of the particles independently glitters.) and is used as a pigment that gives a pearly luster to a paint film.

In recent years, as a design having a higher-grade feeling, a design that exhibits a so-called silky feeling, which is a dense feeling giving a dense luster that is deep and quiet like silk with a reduced particle feeling as compared with a pearly luster (here, the "dense feeling" refers to a silk-like seamless and smooth design.), has been proposed. As a luster pigment capable of giving such a silky feeling, a flaky titanate has been known.

For example, Patent Literature 1 discloses a luster pigment that is a flaky titanate obtained by treating a layered titanate with an acid, and then reacting a basic organic compound with the treated layered titanate to swell or delaminate between its layers, wherein the flaky titanate has an average long diameter of 5 to 30 μm and an average thickness of 0.5 to 300 nm.

In addition, the applicants of the present application have also proposed, in Patent Literature 2, a paint film using a flaky titanate as a luster pigment, the paint film having a soft silvery metallic-tone luster and is smooth with a high-texture color tone. Specifically, this literature describes that a raw material mixture is calcined at a relatively high temperature to give a metal titanate, the metal titanate is treated with an acid, and then a basic organic compound is reacted with the treated metal titanate to delaminate between its layers, thereby producing a flaky titanate having an average long diameter of more than 35 μm as a flake surface and having a basic organic compound at least on a surface thereof.

Patent Literature 3 discloses a flaky titanate suspension liquid useful for the formation of a hard coating film. This literature describes that a layered metal titanate is treated with an acid or the like, then a basic compound having an interlayer space swelling effect is reacted with the treated layered metal titanate to delaminate between its layers, and then the pH of the liquid is adjusted within a range of 6 to 9.

Patent Literature 4 discloses a dispersion liquid of titanate nanosheets having excellent transparency. This literature describes that in the production, a titanate nanosheet dispersion liquid including an amine is brought into contact with a cation exchange resin.

CITATION LIST

Patent Literatures

PATENT LITERATURE 1: JP 2006-257179 A
PATENT LITERATURE 2: JP 2013-184883 A
PATENT LITERATURE 3: JP 2006-206841 A
PATENT LITERATURE 4: JP 2008-247712 A

SUMMARY OF INVENTION

Technical Problem

However, in recent years, a paint film having a unique design feeling unavailable so far has been sought, and there has been a demand for a luster pigment capable of realizing it. Specifically, there has been a demand for a luster pigment capable of giving a paint film having a silky feeling with a strong luster feeling and with a shading feeling (namely, a silky feeling with a low particle feeling and with a high dense feeling) and also capable of exhibiting high weather resistance even in the form of a paint film, which is a pigment that can be put to practical use in terms of industrial production and the like.

The applicants of the present application have further improved the technique which was created by themselves described in the above literature, and found that when reacting a basic organic compound with the treated metal titanate to promote delamination of a layered titanate, thereby producing a flaky titanate having a thickness within a certain range, a silky feeling with a strong luster feeling and with a shading feeling can be given to a paint film. Meanwhile, it has also been found that there is a problem in that such a paint film has a significantly reduced weather resistance.

Patent Literature 1 describes that when the basic organic compound remained between the layers is substituted with cesium ions and thereby reduced, the discoloration of the paint film can be reduced. However, a cesium compound is expensive and far from being suitable for industrial production. In addition, although an average long diameter and an average thickness are described, there is no description regarding the particle size distribution, and also there is no disclosure regarding a method for adjusting the particle size distribution. In this literature, there is no suggestion on the influence that the particle size distribution has on the weather resistance or design feeling of a paint film.

In Patent Literature 2, the amount of basic organic compound used therein is made small to reduce delamination of a layered titanate, and a flaky titanate is made relatively thick, thereby obtaining a flaky titanate capable of giving a soft silvery metallic-tone luster to a paint film. According to this technique, the intended color tone is different from that of the luster pigment at which the present invention aims, and thus the shading feeling and the luster feeling are low. In addition, the amount of remaining basic organic compound comes to a certain level or more, the weather resistance is not sufficient, and after outdoor use for a long period of time, yellowing of the paint film has been observed.

Patent Literature 3 describes that when the pH of a flaky titanate suspension liquid is made within 6 to 9 by neutralization with an acid, the light resistance of a titanate film can be improved, and discoloration can be reduced. However, this technology relates to a hard coating film excellent in transparency and the like, and it is required that no luster is given. In addition, according to this method, in the case of a luster paint film including a relatively thick flaky titanate that exhibits luster, sufficient weather-resistance improving effect has not been observed.

Patent Literature 4 describes that when a titanate nanosheet dispersion liquid including an amine is brought into contact with a cation exchange resin, amines that cause the discoloration of a resin or the like can be reduced. However, this technique also relates to a functional film utilizing a titanate nanosheets excellent in transparency and the like, and thus the functions required therein are inherently different from those of a luster paint film. In addition, according to this method, in the case of a luster paint film including a relatively thick flaky titanate that exhibits luster, sufficient weather-resistance improving effect has not been observed.

Solution to Problem

The present inventors have conducted extensive research in view of the problems of prior art described above. As a result, they have found that the above problems can be solved by a flaky titanate of which the amount of basic functional groups is within a specific range, and the flaky titanate exhibits a specific range as a goniospectrophotometric color measured value when blended in a paint film, and/or by a flaky titanate of which the particle size distribution is within a specific range.

That is, the present invention encompasses the following inventions.

(1) A flaky titanate comprising a basic organic compound,
wherein the basic organic compound has a basic functional group content of 2.4% or less, and
wherein the flaky titanate has a goniospectrophotometric color measured value $\Delta L^*_1$ of 150 or more in the form of a paint film.

(2) A flaky titanate comprising a basic organic compound,
wherein the basic organic compound has a basic functional group content of 2.4% or less, and
wherein the flaky titanate has a goniospectrophotometric color measured value $\Delta L^*_2$ of 60 or more in the form of a paint film.

(3) A flaky titanate having (D90−D10)/D50 of 1.5 or less in a volume particle size distribution measured by a laser diffraction/scattering method,
wherein the D10, D50, and D90 express a cumulative 10% particle size, a median size, and a cumulative 90% particle size, respectively.

(4) A method for producing a flaky titanate, comprising a step of classifying a flaky titanate having a basic organic compound between layers and/or on a surface thereof, thereby adjusting (D90−D10)/D50 in a volume particle size distribution to be 1.5 or less.

(5) A method for producing a flaky titanate, comprising a step of performing delamination between layers of a layered titanate with a basic organic compound,
wherein the layered titanate has (D90−D10)/D50 of 1.5 or less in a volume particle size distribution.

(6) A method for producing a flaky titanate, comprising the steps of:
obtaining a layered titanate by bringing a metal titanate into contact with an acid compound
wherein the metal titanate has (D90−D10)/D50 of 1.5 or less in a volume particle size distribution; and
performing delamination between layers of the layered titanate with a basic organic compound.

(7) The method according to any one of (4) to (6), further comprising a step of allowing a flaky titanate having a basic organic compound between layers and/or on a surface thereof to exist in an aqueous medium with a pH of 6 or more and less than 10.

(8) A luster pigment comprising the flaky titanate according to any one of (1) to (3).

(9) A dispersion liquid comprising at least the flaky titanate according to any one of (1) to (3) and a dispersion medium.

(10) A resin composition comprising at least the flaky titanate according to any one of (1) to (3) and a resin.

(11) A paint composition comprising at least the flaky titanate according to any one of (1) to (3) and a resin.

(12) A plastic resin composition comprising at least the flaky titanate according to any one of (1) to (3) and a plastic resin.

(13) An ink composition comprising at least the flaky titanate according to any one of (1) to (3), a resin, and a solvent.

Advantageous Effects of Invention

According to the present invention, a flaky titanate that is capable of not only giving a silky feeling with a strong luster feeling and with a shading feeling to a paint film but also exhibiting high weather resistance can be provided; and further a method for producing the same, which is inexpensive and suitable for industrial production can be provided. In addition, it is possible to give an even higher silky feeling with a further increased dense feeling and with a reduced particle feeling to a paint film. Therefore, the flaky titanate of the present invention is suitable as a luster pigment, and can be blended with a paint composition, an ink composition, a plastic resin composition, or the like and used. As a result, an article having a unique design feeling unavailable so far can be put to practical use.

DESCRIPTION OF EMBODIMENTS

The present invention is a flaky titanate including a basic organic compound, the basic organic compound having a basic functional group content of 2.4% or less, and the flaky titanate having a goniospectrophotometric color measured value $\Delta L^*_1$ of 150 or more in the form of a paint film. Also, the present invention is a flaky titanate including a basic organic compound, the basic organic compound having a basic functional group content of 2.4% or less, and the flaky titanate having a goniospectrophotometric color measured value $\Delta L^*_2$ of 60 or more in the form of a paint film.

Like this, "titanate" as in the flaky titanate of the present invention refers to a titanate further including, as a composition, in addition to what is generally called "titanate" composed of Ti, O, and H atoms, a basic organic compound (Thus, the "titanate" as in the flaky titanate of the present invention means so-called "titanate composition"). Therefore, the flaky titanate of the present invention can also be referred to as "flaky titanate composition" in view of compositional distinction from what is generally called "titanate" composed of Ti, O, and H atoms.

In addition, the form of the flaky titanate (flaky titanate composition) of the present invention is not limited as long as the purpose of the present invention can be achieved. For example, its particles may be in the form of a powder; in the form of a solution (specifically, the form of a dispersion liquid in which the flaky titanate of the present invention is dispersed as particles in a dispersion medium (, which is the form referred to as so-called "dispersion")); in the form of a cake; or the like.

Titanates having various crystal structures are known, but it is preferable to use a titanate having a layered crystal structure.

Also, among titanates having layered crystal structures, various crystal structures exist. Their crystal forms are crystallographically different from A-type (anatase-type) or R-type (rutile-type) titanium oxide. As a titanate having a layered crystal structure, for example, a titanate with a layered crystal structure having a lepidocrocite structure can be used, and its crystal structure is structured such that sheets each of which is made to extend two-dimensionally in the a-axis and c-axis directions by edge-sharing $TiO_6$ octahedrons are layered so as to include cations therebetween. The crystal structure can be confirmed by powder X-ray diffraction.

In the present invention, "flaky" is, regarding the shape of titanate particles, a concept that encompasses those referred to as plate-shaped, sheet-shaped, flake-shaped, and scale-shaped, having such a shape that the ratio of width and length to thickness is relatively large.

The flaky titanate of the present invention includes a basic organic compound, and the value of a basic functional group content included in the basic organic compound calculated from the following formula is 2.4% or less. The flaky titanate obtained by performing swelling and/or delamination between layers of a titanate having a layered crystal structure with a basic organic compound includes a basic organic compound both on its surface and between its layers. A certain action that such basic functional groups present in the basic organic compound have on the titanium-oxygen unit can be understood as a cause of the decrease in the weather resistance of a paint film including a flaky titanate. When the basic functional group content derived from a basic organic compound is made 2.4% or less, a decrease in the weather resistance of a paint film including a flaky titanate can be reduced. The content is preferably 2.1% or less, more preferably 2.0% or less, still more preferably 1.7% or less, and yet more preferably 1.3% or less. The lower limit on the basic functional group content is not particularly set, and the lower the better. However, usually, basic functional groups derived from a basic organic compound are included in an amount of 0.01% or more. The basic functional group content is determined from the following calculation formula based on the carbon amount (mass %) measured by CHN analysis.

Basic functional group content (%)=(the number of basic functional groups per molecule of a basic organic compound)×(carbon amount (mass %))/ {(atomic weight of carbon×the number of carbon atoms per compound)/(formula weight of $TiO_2$)}

(In the formula, the atomic weight of carbon=12.0, and the formula weight of $TiO_2$=79.9. In the case where the basic organic compound is a polymer, a monomer constituting the polymer is taken as one molecule, and the number of carbon atoms and the number of basic functional groups are thus determined and used for calculation.)

Examples of basic organic compounds include (1) quaternary ammonium hydroxide compounds (tetramethylammonium hydroxide, tetraethylammonium hydroxide, tetrapropylammonium hydroxide, tetrabutylammonium hydroxide, etc.), (2) alkylamine compounds (propylamine, diethylamine, etc.), and (3) alkanolamine compounds (ethanolamine, aminomethyl propanol, etc.).

According to the flaky titanate of the present invention, in the form of a paint film prepared under the following conditions, the goniospectrophotometric color measured value $\Delta L^*_1$ as measured under the following conditions is 150 or more. The goniospectrophotometric color measured value $\Delta L^*_1$ is, when the normal direction to the paint film surface is defined as 0°, the difference between the maximum L* value of the highlight relative to the incident light (−45°) (the L* value of the light-receiving angle 40° or the L* value of the light-receiving angle 50°, whichever is greater) and the L* value of the shade (light-receiving angle −65°). $\Delta L^*_1$ reflects the shading feeling in visual observation. The larger the $\Delta L^*_1$ is, the more strongly the shading feeling of a paint film is perceived. The goniospectrophotometric color measured value $\Delta L^*_1$ is preferably 160 or more, and more preferably 170 or more. The upper limit on $\Delta L^*_1$ is not particularly set, but 200 or less is sufficient.

The goniospectrophotometric color measured value $\Delta L^*_1$ of a paint film is determined as follows. First, a paint including a flaky titanate is prepared. A resin, an additive, and a solvent are weighed according to the composition in Table 1 and dispersed for 5 minutes in a paint shaker to prepare an acrylic silicone resin blend. 1.25 g of a pigment, 11.9 g of the acrylic silicone resin blend, and 9.40 g of pure water are placed in a glass vessel and mixed for 5 minutes in a paint shaker to prepare a paint. The paint thus prepared is applied onto a PET film using a 3 mil doctor blade and forcedly dried at 60° C. for 30 minutes to prepare a paint film. The black ground of a black-and-white chart is applied to the back side of the paint film thus prepared. By using a goniospectrophotometric color measurement system (manufactured by Murakami Color Research Laboratory Co., Ltd., Model GCMS-3), an incident light is applied from −45°, and the L* values of the highlights (light-receiving angles 40° and 50°) and the shade (light-receiving angle −65°) are measured. The L* value of the shade is subtracted from the maximum highlight L* value to give the goniospectrophotometric color measured value $\Delta L^*_1$ of the paint film.

According to the flaky titanate of the present invention, in a paint film prepared under the following conditions different from above, the goniospectrophotometric color measured value $\Delta L^*_2$ measured under the following conditions different from above is 60 or more. The goniospectrophotometric color measured value $\Delta L^*_2$ is, when the normal direction to the paint film surface is defined as 0°, the difference between the L* value of the highlight relative to the incident light (−45°) (light-receiving angle 30°) and the L* value of the shade (light-receiving angle −65°). As in the case of $\Delta L^*_1$, $\Delta L^*_2$ also reflects the shading feeling in visual observation. The larger the $\Delta L^*_2$ is, the more strongly the shading feeling of a paint film is perceived. The goniospectrophotometric color measured value $\Delta L^*_2$ is preferably 65 or more, and more preferably 70 or more. The upper limit on $\Delta L^*_2$ is not particularly set, but 90 or less is sufficient.

The goniospectrophotometric color measured value $\Delta L^*_2$ of a paint film is determined as follows. First, a paint including a flaky titanate is prepared. A resin, an additive, and a solvent are weighed according to the composition in Table 1 and dispersed for 5 minutes in a paint shaker to prepare an acrylic silicone resin blend. 5.0 g of a pigment and 11.9 g of the acrylic silicone resin blend are placed in a glass vessel and mixed for 5 minutes in a paint shaker, and pure water is added to make the paint viscosity 200 mPa·s, thereby preparing a paint. The paint thus prepared is applied onto a PET film using a spray gun and forcedly dried at 60° C. for 30 minutes to prepare a paint film having a film thickness of 10 μm. The white ground of a black-and-white chart is applied to the back side of the paint film thus prepared. By using a multi-angle colorimeter (BYK-mac i manufactured by BYK-Gardner), a light source is applied from a direction of −45°, and the L* values of the highlight (light-receiving angle 30°) and the shade (light-receiving angle −65°) are measured. The L* of the shade is subtracted from the L* of the highlight to give a goniospectrophotometric color measured value $\Delta L^*_2$ of the paint film.

Up to a certain level of thickness, the thinner the flaky titanate, the greater the value of $\Delta L^*_1$ (or $\Delta L^*_2$), that is, the stronger the shading feeling. Meanwhile, when the flaky titanate is thinned too much, the value of $\Delta L^*_1$ (or $\Delta L^*_2$) decreases, that is, the shading feeling starts to decrease. In the case of obtaining a flaky titanate that is sufficiently thin so that the $\Delta L^*_1$ (or $\Delta L^*_2$) falls within the above range, at the time of its production, an increased amount of basic organic compound, which is a delaminating agent, is used. Thus, the residual amount (basic functional group content) is apt to increase, and as a result, the weather resistance is apt to decrease. According to the flaky titanate of the present invention, by making each of the $\Delta L^*_1$ (or $\Delta L^*_2$) and the basic functional group content of the basic organic compound within a specific range, a strong shading feeling and a high weather resistance can be simultaneously given to a paint film.

The average thickness of the flaky titanate is preferably within a range of 0.05 to 0.4 µm, and more preferably within a range of 0.05 to 0.3 µm. The average thickness is determined by the following: preparing a paint film including the flaky titanate, cutting the paint film with a microtome; observing the cross-section under an electron microscope; measuring the thickness of 50 or more particles selected at random; and averaging the measured values.

According to the flaky titanate of the present invention, in the volume particle size distribution measured by a laser diffraction/scattering method, a cumulative 10% particle size, a median size, and a cumulative 90% particle size are determined from the volume particle size distribution as D10, D50, and D90, respectively, and a value calculated from a calculation formula (D90−D10)/D50 is used as an index. The measurement of the volume particle size distribution by a laser diffraction/scattering method is performed by a wet process, in which a dispersion liquid obtained by dispersing, in a dispersion medium, the flaky titanate of the present invention in the form of particles (flaky titanate particles) is measured. The above calculation formula is an index that indicates the sharpness of the particle size distribution of the flaky titanate. The case where this value is small indicates that the particle size distribution is good, while the case where this value is large indicates that the particle size distribution is broad. It is preferable that the value calculated from this calculation formula (D90−D10)/D50 is 1.5 or less. In coarse particles, the ratio of lengths in the longitudinal direction and the thickness direction (aspect ratio) is high. Thus, such particles have an action of increasing the luster feeling, but at the same time have an increase in the particle feeling and reduction of the dense feeling. Therefore, when the abundance ratio of coarse particles is reduced, the resulting paint film has the low particle feeling and the high dense feeling, but the luster feeling and shading feeling are worse. Here, when the abundance ratio of fine particles is also reduced together, the luster feeling/shading feeling can be increased while maintaining the low particle feeling and the high dense feeling, and in addition, the weather resistance can also be increased. It is particularly preferable that (D90−D10)/D50 is 1.2 or less. The measurement of the particle size distribution of the flaky titanate by a laser diffraction/scattering method is performed using a laser diffraction/scattering particle size distribution analyzer (manufactured by HORIBA, Ltd., LA-950) with the refractive index set at 2.50.

The specific particle size can be determined comprehensively considering the required levels of design feeling and weather resistance of the paint film, for example, within a range where (D90−D10)/D50 does not exceed 1.5. For example, D10 is preferably 9 µm or more. As described above, when D10 is 9 µm or more, the abundance ratio of fine particles of less than 9 µm can be made less than 10% which is sufficiently low, and a decrease in the luster feeling or the shading feeling and a decrease in the weather resistance can be reduced. D10 is more preferably 10 µm or more. D90 is preferably 65 µm or less. As described above, when D90 is 65 µm or less, the abundance ratio of coarse particles greater than 65 µm can be made less than 10% which is sufficiently low, and the development of a particle feeling in the paint film can be reduced. D90 is more preferably 55 µm or less. In particular, D99 (cumulative 99% particle size) is preferably 110 µm or less, more preferably 90 µm or less, and still more preferably 80 µm or less. When D99 is 110 µm or less, the abundance ratio of coarse particles greater than 110 µm can be made as low as less than 1%. When D99 is 90 µm or less, the abundance ratio of coarse particles greater than 90 µm can be made less than 1% which is sufficiently low, and thus, as in the case of D90, the development of a particle feeling in the paint film can be reduced. D50 is preferably within a range of 10 to 40 µm, and more preferably within a range of 10 to 30 µm.

The flaky titanate of the present invention may include atom of nitrogen. The content may be 2 to 5 mass %. The nitrogen content can be determined by CHN analysis.

The flaky titanate of the present invention may or may not include an alkali metal (lithium, sodium, potassium, rubidium, and cesium). As in the case of Patent Literature 1, about 20 mass % of an alkali metal may be included. According to the flaky titanate of the present invention, even when the total alkali metal content is 5 mass % or less relative to the flaky titanate, sufficient weather resistance can be provided, and the content may also be 1 mass % or less. In particular, the cesium content may be 0.01 mass % or less. The alkali metal content can be confirmed by X-ray fluorescence spectrometry and is expressed as a numerical value calculated as $M_2O/TiO_2$ (M is an alkali metal).

Next, for the explanation of the method for producing a flaky titanate of the present invention, the entire method for producing a flaky titanate will be briefly described.

First, a metal titanate is produced. A metal oxide or a compound that is decomposed into a metal oxide by heating and a titanium oxide or a compound that is decomposed into a titanium oxide by heating are used as starting materials, and the metal titanate is obtained by mixing and calcining the starting materials. Subsequently, the metal titanate may be crushed as necessary. In addition, in order to obtain a uniform and single-phase metal titanate, it is preferable to sufficiently perform the mixing, and it is preferable to grind and mix the raw material powders in an automatic mortar or the like.

As the metal titanate, an alkali metal-mixed titanate produced as follows is preferable. That is, alkali metal oxides $M_2O$ and $M'_2O$ (M and M' are alkali metals different from each other), or a compound that is decomposed by heating into $M_2O$ and a compound that is decomposed by heating into $M'_2O$, and a titanium dioxide or a compound that produces a titanium dioxide by heating are mixed preferably in an M/M'/Ti molar ratio of 3/1/5 to 3/1/11 and calcined to produce the salt.

As an alkali metal oxide, at least one of the oxides of lithium, sodium, potassium, rubidium, and cesium can be used. In addition, as a compound that is decomposed into an alkali metal oxide by heating, a carbonate, hydroxide, nitrate, or sulfate of an alkali metal can be used, for example. Among them, a carbonate and a hydroxide are preferable. Also, as a compound that produces a titanium oxide by heating, hydrous titanium oxide such as metatitanate or orthotitanate, and organic titanium compound such as titanium alkoxide can be illustrated. Among them, the hydrous titanium oxide is preferable.

It is preferable that the alkali metal-mixed titanate produced above is a compound having an orthorhombic layered structure (lepidocrocite-type crystal structure) represented by a compositional formula $M_x[M'_{x/3}Ti_{2-x/3}]O_4$ (wherein M and M' are alkali metals different from each other, and x is 0.50 to 1.0), in which the sites of $Ti^{4+}$ in the host skeleton are partially substituted with an alkali metal ion different from the alkali metal between its layers. The x value in the compositional formula can be controlled by varying the mixing ratio of starting materials.

The calcination temperature changes depending on the kind of metal titanate, and may be about 1,050 to 1,200° C. In the present invention, the temperature is preferably the range from the temperature of (melting point of the metal titanate—150° C.) to the temperature less than the melting point of the metal titanate. When the calcination temperature is within this range, the grain growth of the metal titanate is promoted, and the yield in the classification step can be increased. In particular, a flaky titanate eventually having a particle size (particle size measured by a laser diffraction/scattering method) with a median size within a range of 10 to 40 μm (preferably 10 to 30 μm) is opt to be obtained with high yield. For example, in the case of a titanate-mixed alkali metal salt wherein M=K, and M'=Li, the calcination temperature is preferably 1,050 to 1,200° C. In the case of a typical composition, that is, M=K, M'=Li, and x=0.8, the temperature is more preferably 1,050 to 1,200° C., and still more preferably 1,100 to 1,180° C. Other calcination conditions, for example, the rate of temperature increase and decrease, the calcination time, the calcination atmosphere, and the like are not particularly limited and may be set accordingly. In addition, a so-called flux method, in which a flux is added during calcination, may also be employed. In that case, the calcination temperature can be lowered and can be 800 to 1,200° C. As a flux, sodium chloride can be mentioned, for example.

Next, the metal titanate obtained in the above step is brought into contact with an acidic compound, thereby producing a titanate compound having a layered crystal structure (which is also referred to as "layered titanate" hereinafter). It is preferable that the acidic compound exists as an aqueous acid solution. Specifically, for example, a method of suspending a metal titanate in an aqueous solvent, then adding an aqueous acid solution thereto, and extracting metal ions (namely, performing an ion-exchange of metal ions in the metal titanate and cations in the acid), thereby producing a layered titanate, can be illustrated.

The aqueous acid solution is not particularly limited and may be an aqueous solution of an inorganic acid or an organic acid. As inorganic acids, hydrochloric acid, sulfuric acid, and the like can be used. As organic acids, acetic acid, oxalic acid, and the like can be used. The concentration can be adjusted arbitrarily, and is preferably 0.5 N to 6 N for the reason that the time required for the reaction is suitable. The concentration is more preferably 1 N to 3 N.

As the metal titanate, it is preferable to use the alkali metal-mixed titanate described above. The alkali metal ions represented by M and M' in this titanate-mixed alkali metal salt are active, and thus cause an exchange reaction with other cations or incorporation due to the intercalation of organic substances. For this reason, when in contact with an acidic compound, alkali metal ions between the layers (M) and in the host skeleton (M') are exchanged with other cations within a short period of time, and in the case of industrial production, a layered titanate can be obtained efficiently with low production costs. As a combination of M and M', the case of the combination (M, M')=(potassium, lithium), (rubidium, lithium), or (cesium, lithium) is preferable, and the case of the combination (M, M')=(potassium, lithium) is particularly preferable.

As a method for performing the reaction with an acidic compound efficiently, a method of mixing a metal titanate and an acidic compound to form an acidic slurry, then obtaining a cake thereof by means of a suction filter such as a filter press or a Buchner funnel, and further passing through a fresh acid while performing the suction can be employed. In addition, it is preferable that after the contact and reaction with an acidic compound, washing is performed with ion-exchange water or the like to remove unnecessary acids. Subsequently, coarse particle separation or the like may be performed as necessary. Also, the step of bringing the metal titanate into contact with an acidic compound may be performed more than once.

As the layered titanate described above, a compound having an orthorhombic layered structure represented by the following compositional formula showing that metal ions between its layers are substituted with hydrogen ions and the sites of $Ti^{4+}$ in the host skeleton are also partially substituted with hydrogen ions:

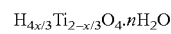

$$H_{4x/3}Ti_{2-x/3}O_4 \cdot nH_2O$$

(wherein x is 0.50 to 1.0, and n is 0 to 2) is preferable. In this case, it is not necessary that all the metal ions are substituted with hydrogen ions, and the metal ions may remain within a range where the effects of the present invention can be obtained.

By the above method, the M element can be substituted with hydrogen ions at high efficiency. Specifically, the substituted amount in the terms of the $M_2O/TiO_2$ conversion can be 1 mass % or less and preferably 0.5 mass % or less.

Next, the layered titanate obtained in the above step and a basic organic compound are brought into contact. As a result, due to an exchange reaction between the hydrogen ions included in the layered titanate and the basic organic compound, the basic organic compound is intercalated between its layers to cause swelling and/or delamination of at least one part layers thereof, thereby obtaining a flaky titanate. The method of the above contact is not particularly limited, and an arbitrary method can be employed. In particular, a method of bringing into contact with the layered titanate and the basic organic compound in a medium is highly efficient, and thus is preferable.

The order of adding a layered titanate and a basic organic compound to a medium is not particularly limited. For example, a layered titanate and a basic organic compound can be added to a medium and mixed by stirring. Alternatively, a basic organic compound may be added to a slurry obtained by dispersing a layered titanate in a medium. Alternatively, a layered titanate may be added to a basic organic compound solution.

During the above contact, an external force may be applied as necessary. When an external force is applied, swelling and/or delamination between layers of the layered titanate proceeds more easily. As a method for applying an external force, for example, a method of stirring a medium including a layered titanate and a basic organic compound can be illustrated. At this time, the stirring conditions may be suitably set. As a method for applying an external force other than stirring, a method of shaking a vessel including a medium may be used. For shaking, a shaking apparatus, a paint conditioner, a shaker, or the like can be used. The shaking conditions in this case may also be suitably set.

The above medium is not particularly limited, and an arbitrary medium may be used. Specifically, water, organic solvents such as alcohol, or mixtures thereof can be illustrated. Industrially, it is preferable to use an aqueous medium including water as a main component.

The basic organic compound is not particularly limited, and at least one kind of arbitrary basic organic compound can be selected and used. Specific examples thereof include (1) quaternary ammonium hydroxide compounds (tetramethylammonium hydroxide, tetraethylammonium hydroxide, tetrapropylammonium hydroxide, tetrabutylammonium hydroxide, etc.), (2) alkylamine compounds (propylamine, diethylamine, etc.), and (3) alkanolamine compounds (ethanolamine, aminomethyl propanol, etc.). Among them, alkanolamine compounds are preferable, and it is more preferable to use aminomethyl propanol. In the case of (1), the progress of the swelling and/or delamination between layers of the layered titanate is relatively quick. In the case of (2), the progress of the swelling and/or delamination between layers of the layered titanate is relatively slow. The case of (3) is generally in therebetween.

The temperature of the above contact is not particularly limited and can be suitably set. When the reaction temperature is room temperature (20 to 30° C.), the delamination state can be easily controlled, and this is thus preferable. The reaction rate is not particularly limited, and can be suitably set. The layered titanate and the basic organic compound may be mixed at once, mixed continuously in small portions, or mixed intermittently in small portions. The reaction time is not particularly limited, and can be suitably set according to the reaction temperature and the desired swelling and/or delamination state. For example, in the case where the reaction temperature is 20 to 30° C., the time is preferably about 30 minutes to 12 hours. In the case where the temperature is higher, in the case where the mixing is performed continuously or intermittently, or in the case where the time is longer, the swelling and/or delamination between layers of the layered titanate proceeds more easily.

The amount of basic organic compound to be brought into contact with the layered titanate is preferably within a range of 0.01 to 10 neutralization equivalents relative to hydrogen ions included in the layered titanate. When the amount of basic organic compound is too small, hydrogen ions are not sufficiently desorbed, and delamination does not proceed. Meanwhile, the larger the amount of basic organic compound is, the more easily the swelling and/or delamination between layers in the layered titanate proceeds. However, when the amount is too large, the resulting swelling makes delamination between layers rather difficult. Accordingly, the above range is preferable.

The concentration of the layered titanate relative to the medium is preferably 1 to 20 mass %, more preferably 3 to 15 mass %, and still more preferably 5 to 15 mass %. The lower the concentration is, the more easily the swelling and/or delamination between layers of the layered titanate proceeds. Meanwhile, the higher the concentration, the higher the production efficiency. Accordingly, the above range is preferable.

The degree of delamination in the layered titanate compound can be controlled by suitably setting conditions such as the following: the kind of the basic organic compound used and its amount; the concentration of the layered titanate; the intercalation of delamination-reducing cationic species between layers thereof; the temperature, speed, and time for bringing the two into contact; the external force application method or the degree of the external force; and the like. As a result, the thickness of the flaky titanate obtained can be controlled to the desired thickness. In addition, its dispersion stability is maintained.

In this manner, a flaky titanate dispersion liquid can be obtained. In addition, a flaky titanate can also be separated as its solid content by the following method.

For example, a flaky titanate can be separated by solid-liquid separation from the above flaky titanate dispersion liquid to obtain its solid content. For solid-liquid separation, known filtrating methods can be used. For example, filtration devices that are usually industrially used, such as a rotary press and a filter press, can be used. At this time, washing may be performed as necessary to remove soluble salts and the like. Subsequently, drying may be performed as necessary. For washing, pure water can be used, for example. Drying can also be performed using an arbitrary device, and the drying temperature and time can also be suitably set. The drying temperature is preferably 50 to 300° C., and more preferably 100 to 300° C.

Alternatively, the above flaky titanate dispersion liquid can also be freeze-dried to obtain its solid content as a freeze-dried product. For freeze dry, an ordinary freeze-drier can be used. The obtained freeze-dried product may be successively subjected to ice sublimation in vacuum.

Alternatively, the above flaky titanate dispersion liquid can also be centrifuged, and the precipitate is separated from the medium and dried to obtain its solid content. For centrifugation, an ordinary centrifuge can be used. Centrifugation may also be repeated twice or more.

Alternatively, the above flaky titanate dispersion liquid can also be spray-dried to obtain its solid content. For spray drying, an ordinary spray drier can be used.

Alternatively, the above solid content separation methods can also be performed in combination with two or more thereof to obtain its solid content. Also, washing and solid content separation can be performed in combination with two or more thereof.

The obtained solid content can be ground as necessary. For grinding, the known grinders described below can be used. In terms of maintaining the shape of the flaky titanate (dimension of the flake surface, size), a weaker grinding force is more preferable. Examples of such grinders include a hammer mill and a pin mill.

A second invention of the present invention is a method for producing a flaky titanate, including a step of classifying a flaky titanate having a basic organic compound between layers and/or on a surface thereof, thereby adjusting (D90–D10)/D50 in the volume particle size distribution measured by a laser diffraction/scattering method to be 1.5 or less.

As one embodiment thereof, for example, a method for producing a flaky titanate, including preparing or purchasing a flaky titanate having a basic organic compound between layers and/or on a surface thereof, and classifying the flaky titanate so that (D90–D10)/D50 thereof in the volume particle size distribution measured by a laser diffraction/scattering method is 1.5 or less, can be illustrated.

As another embodiment thereof, a method for producing a flaky titanate, including the following steps: a step of obtaining a metal titanate; a step of bringing the metal titanate into contact with an acidic compound to obtain a layered titanate; a step of mixing the layered titanate with a basic organic compound to cause swelling and/or delamination between layers of the layered titanate; and a step of classifying the flaky titanate obtained in the above step so as to adjust (D90–D10)/D50 in the volume particle size distribution measured by a laser diffraction/scattering method to be 1.5 or less, the flaky titanate having performed delamination and/or swelling between layers thereof and including the basic organic compound between layers and/or on a surface thereof, can be illustrated.

With respect to the flaky titanate produced in this manner, when its median size measured by a laser diffraction/scattering method is about 10 to 40 µm (preferably about 10 to 30 µm), a paint film blending such a flaky titanate develops a shading feeling and a dense feeling. Here, when a metal titanate having a flake surface dimension of several tens of micrometers is synthesized, its particle size distribution is extremely broad, and thus the particle size distribution of the eventually obtained flaky titanate is similarly also broad. Although it is known that use of a flux at the time of synthesizing a metal titanate can somewhat reduce the variation in particle size, the particle size distribution is still broad, and particularly the generation of coarse particles is unavoidable. In the present invention, a classification step is added, and (D90–D10)/D50 in the volume particle size distribution measured by a laser diffraction/scattering method is adjusted to be 1.5 or less.

The classification is preferably such that the abundance ratio of coarse particles and that of fine particles are both reduced. In the volume particle size distribution measured by a laser diffraction/scattering method, when (D90–D10)/D50 is 1.5 or less, a paint film having excellent weather resistance and a unique silky feeling with no particle feeling can be provided. The value is more preferably 1.2 or less.

The basic organic compound used as a delaminating agent remains in the flaky titanate. Some of the basic organic compound can be understood as being included between layers of the flaky titanate as cations, and some of the basic organic compound as being present on the surface of the flaky titanate particles. The present inventors have found that the remained basic organic compound is abundantly present on the surface of the fine particles, and that the finer the particles are, the higher the relative basic organic compound content tends to be. Thus, when the amount of fine particles is reduced by classification, the amount of basic organic compound contained in the eventually produced flaky titanate powder can be reduced, and as a result, the basic functional group content can be reduced. Accordingly, the weather resistance of a paint film can be significantly increased.

In addition, a paint film using such a flaky titanate as a luster pigment exhibits, in addition to a shading feeling and a dense feeling, a stronger luster feeling. This can be understood as an effect of relative decrease in the amount of fine particles which have a low aspect ratio and cause reduced luster feeling due to the scattering at particle edges. For the same reason, there is also the effect that the silky feeling of a paint film is further increased. The threshold of particles to be removed, namely, the removal amount may be determined within a range where (D90–D10)/D50 in the volume particle size distribution measured by a laser diffraction/scattering method does not exceed 1.5 by comprehensively considering required levels of luster and weather resistance of the paint film, the yield, and the like. For example, classification is preferably performed such that D10 (cumulative 10% particle size) in the volume particle size distribution obtained by measuring the flaky titanate after the completion of the classification step by a laser diffraction/scattering method is 9 µm or more.

By performing classification to reduce coarse particles, the visual particle feeling of the paint film can be significantly reduced or reduced up to a visually unrecognizable degree. Here, "classification of coarse particles" in this specification is not limited to the operation of removing coarse particles using various classifiers to reduce its content ratio as described below, but also includes reducing coarse particles by adjusting the strength of an external force applied to the flaky titanate in the production process (e.g. the shear force at the time of delamination of the layered titanate, the external force applied to the flaky titanate at the time of classifying fine particles of the flaky titanate using a classifier, the centrifugal force at the time of centrifuging the flaky titanate dispersion liquid, the shear force at the time of spray-drying the flaky titanate dispersion liquid, or the like). Of course, the classification using a classifier can be used in combination with the classification by adjusting the strength of an external force applied to the flaky titanate.

As a result, a paint film with a unique silky feeling, which has a strong shading feeling and a high luster feeling with no particle feeling, can be provided. The threshold of particles to be removed, namely, the removal amount may be determined within a range where (D90–D10)/D50 in the volume particle size distribution measured by a laser diffraction/scattering method does not exceed 1.5 by comprehensively considering required levels of luster and weather resistance of the paint film, the yield, and the like. For example, classification can be performed such that D90 (cumulative 90% particle size) in the volume particle size distribution obtained by measuring the flaky titanate after the completion of the classification step by a laser diffraction/scattering method is 65 µm or less. In particular, classification can be performed such that D99 (cumulative 99% particle size) is 90 µm or less.

Classification using a classifier may be performed by a wet process or a dry process. The device used for classification is not particularly limited, and an arbitrary classifier can be used. Examples of wet classifiers include a vibrating sieve, a gravity field classifier (thickener, etc.), and a centrifugal field classifier (liquid cyclone, etc.). Examples of dry classifiers include a vibrating sieve, a centrifugal field classifier (dry cyclone, etc.), and an inertial force field classifier (classifier, etc.). When the layered titanate and the basic organic compound are brought into contact to cause delamination in the layered titanate, and then classification by a wet process is directly applied, the step can be simplified, and this is thus preferable.

The adjustment of particle size distribution by classification using a classifier can be performed by a known method. For example, the adjustment is possible by selecting the opening size of the sieve. In addition, the adjustment may also be made by suitably setting the conditions according to the classification technique to be employed, such as the sample supply rate, the residence time on the sieve, and the shaking conditions.

For example, in case of classification through a wet sieve, a slurry to be classified is thrown in the larger-opening mesh using a slurry screener (manufactured by Aco Japan Co., Ltd.), and thus can be classified into "on the screen" and "under the screen". Next, the slurry under the screen is thrown in the smaller-opening mesh and thus can be classified into "on the screen" and "under the screen". In this manner, the slurry classified into three levels can be obtained (hereinafter sometimes referred to as "on the sieve", "among sieves", and "under the sieve"). These operations can also be performed using a general vibrating sieve. As long as the effects of the present invention can obtained, a sieve having an arbitrary opening size can be used. The opening size of the larger sieve used may be, for example, 75 μm or less, preferably 53 μm or less, and more preferably 45 μm or less. The opening size of the smaller sieve used may be, for example, 6 μm or more, preferably 10 μm or more, and more preferably 20 μm or more.

A third invention of the present invention is a method for producing a flaky titanate, including a step of performing swelling and/or delamination between layers of a layered titanate with a basic organic compound, wherein the layered titanate has (D90−D10)/D50 of 1.5 or less in a volume particle size distribution measured by a laser diffraction/scattering method.

The measurement of the volume particle size of a layered titanate by a laser diffraction/scattering method is performed using a dispersion liquid of the layered titanate in the same manner as in the measurement of the volume particle size distribution of "flaky titanate" by a laser diffraction/scattering method described above, and the calculation of particle sizes (D10, D50, D90, etc.) is also performed in the same manner as in the calculation of particle sizes of "flaky titanate" by a laser diffraction/scattering method described above.

For example, a method for producing a flaky titanate, including the following steps: a step of preparing or purchasing a layered titanate and classifying the layered titanate so that (D90−D10)/D50 thereof in the volume particle size distribution measured by a laser diffraction/scattering method is 1.5 or less; and a step of performing swelling and/or delamination between layers of the classified layered titanate with a basic organic compound, can be illustrated.

As another embodiment thereof, for example, a method for producing a flaky titanate, including the following steps: a step of preparing or purchasing a layered titanate wherein the layered titanate has, by classification, (D90−D10)/D50 of 1.5 or less in the volume particle size distribution measured by a laser diffraction/scattering method; and a step of performing swelling and/or delamination between layers of the layered titanate with a basic organic compound, can be illustrated.

As still another embodiment thereof, for example, a method for producing a flaky titanate, including the following steps: a step of obtaining a metal titanate; a step of bringing the metal titanate into contact with an acidic compound to obtain a layered titanate; a step of classifying the layered titanate so that (D90−D10)/D50 thereof in the volume particle size distribution measured by a laser diffraction/scattering method is 1.5 or less; and a step of mixing the classified layered titanate and a basic organic compound to cause swelling and/or delamination between layers of the layered titanate, can be illustrated.

As described above, similarly, the abundance of the basic organic compound (basic functional group content) after delamination also tends to be higher in finer titanate particles, and a decrease in fine particles results in an increased luster feeling and an increased silky feeling. Also, similarly, when coarse titanate particles are reduced, the particle feeling decreases. Therefore, in the case where the ratio of fine particles and coarse particles of the layered titanate are low, for example, even in the case where the layered titanate is classified, the effects of the present invention are similarly obtained.

Classification may be performed by a wet process or a dry process. When the metal titanate and the acidic compound are brought into contact to obtain a layered titanate, and then classification by a wet process is directly applied, the step can be simplified. The classifier or the classification method is not particularly limited, and an arbitrary method can be employed. For example, classification can be performed in the same manner as in the classification of a flaky titanate having a basic organic compound between layers and/or on a surface thereof described above.

It is also possible that the layered titanate is classified and the flaky titanate after swelling and/or delamination is classified.

A fourth invention of the present invention is a method for producing a flaky titanate, including the following steps: a step of obtaining a layered titanate by bringing a metal titanate into contact with an acidic compound, wherein the metal titanate has (D90−D10)/D50 of 1.5 or less in the volume particle size distribution measured by a laser diffraction/scattering method; and a step of performing swelling and/or delamination between layers of the layered titanate with a basic organic compound.

The measurement of the volume particle size of a metal titanate by a laser diffraction/scattering method is performed using a dispersion liquid of the metal titanate in the same manner as in the measurement of the volume particle size distribution of "flaky titanate" by a laser diffraction/scattering method described above, and the calculation of particle sizes (D10, D50, D90, etc.) is also performed in the same manner as in the calculation of particle sizes of "flaky titanate" by a laser diffraction/scattering method described above.

For example, a method for producing a flaky titanate, including the following steps: a step of obtaining a metal titanate; a step of classifying the metal titanate so that (D90−D10)/D50 thereof in the volume particle size distribution measured by a laser diffraction/scattering method is 1.5 or less; a step of bringing the classified metal titanate into contact with an acidic compound to obtain a layered titanate; and a step of mixing the layered titanate and a basic organic compound to cause swelling and/or delamination between layers of the layered titanate, can be illustrated.

As described above, similarly, the abundance of the basic organic compound (basic functional group content) after delamination also tends to be higher in finer titanate particles, and a decrease in fine particles results in an increased luster feeling and an increased silky feeling. Also, similarly, when coarse titanate particles are reduced, the particle feeling decreases. Therefore, in the case where the ratio of fine particles and coarse particles in the metal titanate are low, for example, even in the case where the metal titanate is classified, the effects of the present invention are similarly obtained.

It is also possible that the metal titanate is classified and the flaky titanate after swelling and/or delamination is classified. In addition, it is also possible that the metal titanate, the layered titanate, and the flaky titanate after swelling and/or delamination are each classified.

Before the classification step, the method may also include a step of grinding the metal titanate, layered titanate, or flaky titanate. In the case where coarse particles are abundantly included in these particles, as a result of grinding in advance, the yield can be increased. At this time, when grinding is performed too much, fine particles increase too much. Therefore, it is preferable that the grinding conditions are suitably adjusted such that the ratio of particles within the desired particle size range becomes high. Grinding may also be performed while performing delamination in a delamination step.

Grinding is not particularly limited and may be performed by a wet process or a dry process. Also, the grinder is not particularly limited, and a known grinder can be selected and used according to the desired grinding strength. For example, wet grinders such as a vertical sand mill, a horizontal sand mill, and a ball mill, impact grinders such as a hammer mill and a pin mill, attrition grinders such as a crusher, airflow grinders such as a jet mill, and the like may be used.

In addition, particles separated as coarse particles on the sieve in the classification step may also be ground and mixed with particles under the sieve. For example, a method for producing a flaky titanate, including the following steps: a step of classifying a flaky titanate that has performed swelling and/or delamination between layers thereof; and a step of grinding particles classified as coarse particles. As a result, the yield can be increased. The classifier or the classification method is not particularly limited, and an arbitrary method can be employed. For example, classification can be performed in the same manner as in the classification of a flaky titanate having a basic organic compound between layers and/or on a surface thereof described above. The grinding method or the grinder is not particularly limited, and the grinders described above may be arbitrarily selected.

In addition, it is also possible that particles separated as coarse particles on the sieve in the classification step are ground and the classification step is applied again. For example, a method for producing a flaky titanate, including the following steps: a step of classifying a flaky titanate that has performed swelling and/or delamination between layers thereof; and a step of grinding particles classified as coarse particles; and a step of classifying the ground product again, can be illustrated. The particles among sieves, obtained by reclassification can be mixed with the original particles among sieves and used. As a result, the yield can be increased. The classifier or the classification method is not particularly limited, and an arbitrary method can be employed. For example, classification can be performed in the same manner as in the classification of a flaky titanate having a basic organic compound between layers and/or on a surface thereof described above. The grinding method or the grinder is not particularly limited, and the grinders described above may be arbitrarily selected.

In addition, it is also possible that particles separated as fine particles under the sieve in the classification step are partially re-mixed with particles on the sieve and used. Incidentally, with an increase in the abundance ratio of fine particles, the weather resistance also continuously decreases, and the particle feeling also decreases. Therefore, the re-mixing amount may be suitably determined comprehensively considering the required levels of luster and weather resistance of the paint film, the yield, and the like. As a result, the yield can be increased.

In addition, it is also possible that particles separated as coarse particles on the sieve in the classification step are partially re-mixed with particles under the sieve and used. Incidentally, with an increase in the abundance ratio of coarse particles, the particle feeling when used in a paint film continuously increases. Therefore, the re-mixing amount may be suitably determined comprehensively considering the required level of luster of the paint film, the yield, and the like. As a result, the yield can be increased.

In the method for producing a flaky titanate of the present invention, it is preferable to include a step of allowing the flaky titanate including a basic organic compound between layers and/or on a surface thereof to exist in an aqueous medium having a pH of 6 or more and less than 10. Alternatively, it is preferable to further include, as a step later than the step of bringing the layered titanate into contact with a basic organic compound to cause swelling and/or delamination between layers of the layered titanate, a step of allowing the flaky titanate including a basic organic compound between layers and/or on a surface thereof to exist in an aqueous medium having a pH of 6 or more and less than 10. As a flaky titanate including a basic organic compound between layers and/or on a surface thereof, a flaky titanate obtained by the following: bringing a layered titanate into contact with a basic organic compound; and intercalating the basic organic compound between layers of the layered titanate, thereby performing swelling and/or delamination in at least one part layers thereof, can be illustrated.

For example, after the following steps: a step of bringing a metal titanate into contact with an acidic compound to obtain a layered titanate, wherein the metal titanate has, by classification, (D90–D10)/D50 of 1.5 or less in the volume particle size distribution; and a step of bringing the layered titanate into contact with a basic organic compound to cause swelling and/or delamination between layers of the layered titanate, a step of allowing the flaky titanate including a basic organic compound between layers and/or on a surface thereof to exist in an aqueous medium having a pH of 6 or more and less than 10 may further be included.

Alternatively, after a step of bringing the layered titanate into contact with a basic organic compound to cause swelling and/or delamination between layers of the layered titanate wherein the layered titanate has, by classification, (D90–D10)/1350 of 1.5 or less in the volume particle size distribution, a step of allowing the flaky titanate including a basic organic compound between layers and/or on a surface thereof to exist in an aqueous medium having a pH of 6 or more and less than 10 may further be included.

Alternatively, after the following steps: a step of bringing the layered titanate into contact with a basic organic compound to cause swelling and/or delamination between layers of the layered titanate; and a step of classifying the flaky titanate so that (D90–D10)/D50 thereof in the volume particle size distribution is 1.5 or less; a step of allowing the flaky titanate including a basic organic compound between layers and/or on a surface thereof to exist in an aqueous medium having a pH of 6 or more and less than 10 may further be included.

Alternatively, the following steps: a step of bringing the layered titanate into contact with a basic organic compound to cause swelling and/or delamination between layers of the layered titanate; subsequently, a step of allowing a flaky titanate including a basic organic compound between layers and/or on a surface thereof to exist in an aqueous medium having a pH of 6 or more and less than 10; and then, a step of classifying the flaky titanate so that (D90–D10)/D50 thereof in the volume particle size distribution is 1.5 or less may further be included.

With respect to the treatment of allowing a flaky titanate to exist in an aqueous medium having a pH within the above range, its treatment alone cannot reduce the basic functional group content up to such a degree that sufficient weather resistance is exhibited. However, when the classification step and the step of allowing a flaky titanate to exist in an aqueous medium having a pH within the above range are combined, synergistically, the amount of remaining basic organic compound can further be reduced. That is, the basic functional group content in the eventually produced flaky titanate powder can be reduced, and the weather resistance of the paint film can be significantly increased. For the reduction of the basic functional group content, it is originally effective to make the pH less than 6. However, once the pH is made less than 6, the flaky titanate aggregates, resulting in a decrease in the design feeling of the resulting paint film. When the pH is 6 or more and less than 10, as a result of combination with the classification step, the paint film can provide both design features and weather resistance.

As a method for allowing a flaky titanate to exist in an aqueous medium having a pH of 6 or more and less than 10, for example, a method of bringing an aqueous solvent including a flaky titanate into contact with an acidic compound to make the pH 6 or more and less than 10 can be illustrated. The acidic compound is not particularly limited, and an inorganic acid, an organic acid, and the like can be arbitrarily used. As the inorganic acid, hydrochloric acid, sulfuric acid, and the like can be illustrated, and as the organic acid, acetic acid, oxalic acid, and the like can be illustrated. It is also possible that these acidic compounds are dissolved in water as an aqueous acidic solution, and then mixed with an aqueous solvent including a flaky titanate. It is preferable that the flaky titanate is maintained in this state for a certain amount of time. For example, the flaky titanate is preferably maintained for 30 minutes or more. At this time, it is preferable that stirring is performed because, as a result, the efficiency of basic organic compound removal increases. The temperature is not particularly limited either, or may be arbitrarily set. For example, the temperature can be 20 to 70° C.

It is also possible to add, after allowing a flaky titanate to exist in an aqueous medium having a pH of 6 or more and less than 10, a step of washing the flaky titanate. For washing, known methods may be used. For example, it is possible to use a method of using a filtration device such as a rotary press or a filter press, or a method of settling a solid content by a thickener, a decanter, a centrifuge, or the like, then removing the supernatant, and washing the solid content with water. In particular, as in the methods described above (a method comprising the following steps: a step of bringing the layered titanate into contact with a basic organic compound to cause swelling and/or delamination between layers of the layered titanate; subsequently, a step of allowing a flaky titanate including a basic organic compound between layers and/or on a surface thereof to exist in an aqueous medium having a pH of 6 or more and less than 10; and then, a step of classifying the flaky titanate so that (D90−D10)/D50 thereof in the volume particle size distribution is 1.5 or less), when the classification operation is performed after allowing a flaky titanate to exist in an aqueous medium having a pH of 6 or more and less than 10, the slurry under the sieve resulting from classification abundantly includes a basic organic compound. Accordingly, a cleaning effect due to the removal of the slurry under the sieve by classification is also obtained at the same time, making it possible to simplify the production step.

Next, a fifth invention of the present invention is a luster pigment including the flaky titanate of the first invention.

Next, a sixth invention of the present invention is a dispersion liquid including at least the flaky titanate of the first invention and a dispersion medium.

The above dispersion medium is not particularly limited, and an arbitrary solvent may be used. Specifically, water, organic solvents such as alcohol, or mixtures thereof can be illustrated. Industrially, it is preferable to use an aqueous medium including water as a main component.

In the case of using an organic solvent, its kinds can be suitably selected according to the intended use. In particular, an organic solvent having a permittivity of 5 or more is preferable because a flaky titanate is easily dispersed, and an organic solvent having a permittivity of 10 or more is more preferable. As such an organic solvent, at least one selected from the group consisting of acetonitrile (permittivity: 37, boiling point: 82° C.), methanol (permittivity: 33, boiling point: 65° C.), dimethyl sulfoxide (permittivity: 47, boiling point: 189° C.), ethanol (permittivity: 24, boiling point: 78.3° C.), 2-propanol (permittivity: 18, boiling point: 82.5° C.), N,N-dimethylformamide (permittivity: 38, boiling point: 153° C.), methyl ethyl ketone (permittivity: 18.5, boiling point: 80° C.), 1-butanol (permittivity: 17.8, boiling point: 118° C.), and formamide (permittivity: 109, boiling point: 210° C.) is more preferable. In addition, as the organic solvent, one having a low boiling point is preferable because of facilitating drying at a low temperature. The organic solvent preferably has a boiling point of 200° C. or less, still more preferably 150° C. or less, and still more preferably 100° C. or less.

In addition to the flaky titanate and the dispersion medium, the dispersion liquid of the present invention may also include, as long as the effects of the present invention are not inhibited, various additives and fillers as third components, such as resin binders, dispersants, surface control agents (leveling agents, wettability improvers), pH adjusters, defoamers, emulsifiers, colorants, extenders, antifungal agents, curing aids, and thickeners. Specifically, examples of resin binders include (1) inorganic binders ((a) polymerizable silicon compounds (hydrolyzable silane or a hydrolysis product or partial condensate thereof, sodium silicate aqueous solution, colloidal silica, organopolysiloxane, etc.), (b) metal alkoxides, etc.) and (2) organic binders (alkyd-based resin, acrylic-based resin, polyester-based resin, epoxy-based resin, fluorine-based resin, modified silicone-based resin). Examples of dispersants include (1) surfactants ((a) anionic surfactants (carboxylates, sulfates, sulfonates, phosphates, etc.), (b) cationic surfactants (alkylamine salts, quaternary ammonium salts of alkylamine, aromatic quaternary ammonium salts, heterocyclic quaternary ammonium salts, etc.), (c) amphoteric surfactants (betaine type, amino acid type, alkylamine oxide, nitrogen-containing heterocyclic type, etc.), (d) nonionic surfactants (ether type, ether ester type, ester type, nitrogen-containing type, etc.), (2) silicone-based dispersants (alkyl-modified polysiloxanes, polyoxyalkylene-modified polysiloxanes, etc.), (3) phosphate-based dispersants (sodium phosphate, sodium pyrophosphate, sodium orthophosphate, sodium metaphosphate, sodium tripolyphosphate, etc.), and (4) alkanolamines (aminomethyl propanol, aminomethyl propanediol, etc.). A surface control agent controls the surface tension of an organic solvent dispersion to prevent defects such as cissing and cratering, and examples thereof include acrylic-based surface control agents, vinyl-based surface control agents, silicone-based surface control agents, and fluorine-based surface control agents.

The amount of third components added other than the flaky titanate and the dispersion medium can be suitably adjusted. For example, in the case of using the above surfactants, silicone-based dispersants, phosphate-based dispersants, and alkanolamines as a dispersant, its amount is preferably about 0.005 to 5.0 mass %, more preferably about 0.01 to 2.0 mass %, based on the weight of the flaky titanate. As a surface control agent, the above silicone-based surface control agents can be used, and its amount is preferably about 0.005 to 5.0 mass %, more preferably about 0.01 to 2.0 mass %, based on the weight of the flaky titanate.

The dispersion liquid may be prepared by mixing the materials and dispersing the flaky titanate. Dispersion may be performed using an ordinary stirring machine, a dispersing machine such as a colloid mill, a ball mill, or a bead mill, a shaking apparatus, a paint conditioner, a shaker, a disper, or the like. The order of mixing of the above materials is not particularly limited, and can be suitably determined according to the properties of each material. Usually, it is preferable that after adding the flaky titanate to a dispersion medium, the above third components are further added.

Next, a seventh invention of the present invention is a resin composition including at least the flaky titanate of the present invention. Examples of resin compositions include a plastic resin composition, a paint composition, and an ink composition.

The plastic resin used in the present invention is not particularly limited, and may be as follows, for example. Further, for the purpose of improving physical properties such as impact resistance, scratch resistance, chemical resistance, and flowabilty, it is also possible to use a combination of two or more kinds of the following resins.

Examples of thermoplastic resins include the following:

(1) general-purpose plastic resins ((a) polyolefin resin (polyethylene, polypropylene, etc.), (b) polyvinyl chloride resin, (c) acrylonitrile-butadiene-styrene resin, (d) polystyrene resin, (e) methacrylic resin, (f) polyvinylidene chloride resin, etc.);

(2) engineering plastic resins ((a) polycarbonate resin, (b) polyethylene terephthalate resin, (c) polyamide resin, (d) polyacetal resin, (e) modified polyphenylene ether, (f) fluorine resin, etc.); and (3) super-engineering plastic resins ((a) polyphenylene sulfide resin (PPS), (b) polysulfone resin (PSF), (c) polyethersulfone resin (PES), (d) amorphous polyarylate resin (PAR), (e) liquid crystal polymer (LCP), (f) polyetheretherketone resin (PEEK), (g) polyamideimide resin (PAI), and (h) polyetherimide resin (PEI)).

The blending ratio of the flaky titanate and the plastic resin are not particularly limited. However, based on 100 parts by mass of the plastic resin, the flaky titanate is usually within a range of 1 to 80 parts by mass, and still more preferably within a range of 1 to 60 parts by mass. In the case of a masterbatch, its amount is within a range of 10 to 900 parts by mass, and still more preferably within a range of 50 to 500 parts by mass. In addition, according to the intended use, reinforcing materials such as glass fibers, and various additives such as stabilizers, dispersants, lubricants, antioxidants, UV absorbers, and fillers, which are known to those skilled in the art may also be added.

Such a resin composition can be obtained by blending the above flaky titanate with a molten resin by the use of a kneader. The kneader may be one generally used, such as a single-screw extruder, a twin-screw extruder, an intensive mixer such as a Banbury mixer, and a roll-molding machine.

A flaky titanate-blended resin composition obtained using a kneader can be molded by known methods. In particular, when molding is performed by a method of applying such a load that the flaky titanate in the resin is oriented, the luster attributable to the flaky titanate can be increased. As such a molding method, for example, a blow molding can be illustrated. In addition, the molded article can be heated and stretched. Also by this method, similarly, the luster attributable to the flaky titanate can be increased.

The paint composition or ink composition of the present invention includes at least the above flaky titanate, a resin component, and a solvent. As a resin component, for example, an alkyd-based resin, an acrylic-based resin, a polyester-based resin, an epoxy-based resin, an amino-based resin, a fluorine-based resin, a modified silicone-based resin, a urethane-based resin, a vinyl-based resin, and the like can be illustrated and suitably selected. Such a resin component is not particularly limited and may be an organic solvent soluble type, a water soluble type, an emulsion type, or the like, and the curing method is not also limited and may be a heat curing type, a cold curing type, a UV curing type, an electron radiation curing type, or the like. Examples of solvents include organic solvents such as alcohols, esters, ethers, ketones, aromatic hydrocarbons, and aliphatic hydrocarbons, water, and mixed solvents thereof. The kind of solvent is selected according to the adequacy with a resin component. In addition, according to the purpose, colorants such as organic pigments, inorganic pigments, and dyes; various additives and fillers such as extenders, surfactants, plasticizers, curing aids, dryers, defoamers, thickeners, emulsifiers, flow adjustors, antiskinning agents, color separation preventive agents, UV absorbers, antifungal agents; and the like may also be included. These raw materials may be prepared according to a known formulation, thereby forming a paint composition or an ink composition. Alternatively, a curing agent, a curing aid, and a curable resin component are prepared as separate curing solutions and can be used as a two-pack paint mixed at the time of coating.

The paint composition of the present invention may be applied to an object to be coated by a known method to form a paint film. Specifically, general methods can be used without limitations, such as spin coating, spray coating, roller coating, dip coating, flow coating, knife coating, electrostatic coating, bar coating, die coating, brush coating, and a method of dropping liquid droplets. The apparatus used for the application of a paint composition can be suitably selected from known apparatus such as a spray gun, a roller, a brush, a bar coater, and a doctor blade.

The application method is not particularly limited. A predetermined film thickness may be performed by once application or may also be performed by twice or more applications. When the film thickness per one application is thinner, the mobility (inclination) of the flaky titanate is restricted, making it easier to cause orientation parallel to the paint film. Therefore, an application method of performing twice or more applications to make a predetermined film thickness can result in an improved degree of orientation in the flaky titanate, and form a paint film with an even higher luster feeling, and thus is preferable. In terms of luster feeling and cost efficiency, the number of applications is preferably 2 to 15, and more preferably 4 to 10.

EXAMPLES

Hereinafter, the present invention will be described in further detail with reference to examples. However, the present invention is not limited to the examples.

Example 1

Titanium oxide (Titanium Oxide A-100 manufactured by Ishihara Sangyo Kaisha), potassium carbonate, and lithium carbonate (both reagents manufactured by Kanto Kagaku) were thoroughly mixed in an agate mortar in a mass ratio of 100:40:9.2, and then calcined at 1,150° C. for 5 hours in the atmosphere to synthesize lithium potassium titanate having an orthorhombic lepidocrocite structure ($K_{0.8}Li_{0.27}Ti_{1.73}O_4$). The obtained lithium potassium titanate was ground in an agate mortar to obtain a lithium potassium titanate powder.

The obtained lithium potassium titanate powder and four times its mass of a 1.1 N aqueous sulfuric acid solution were mixed, stirred for 30 minutes, and ion-exchanged to obtain a layered titanate. The obtained layered titanate solid was filtrated and washed to obtain a layered titanate cake. The potassium amount included in the layered titanate cake was analyzed with a X-ray fluorescence spectrometer (RIX2100 manufactured by Rigaku). The result was 0.25% as $K_2O/TiO_2$.

The obtained layered titanate cake was redispersed in pure water to be 100 g/L in terms of $TiO_2$ conversion to give a layered titanate dispersion liquid. The layered titanate dispersion liquid and aqueous ammonia were mixed to adjust the pH to 7.3. Subsequently, per 100 g of $TiO_2$, 21.4 g of a 90% aqueous solution of 2-amino-2-methyl-1-propanol (0.3 neutralization equivalents relative to hydrogen ions included in the layered titanate) was added and stirred at room temperature for 1 hour to give a flaky titanate dispersion liquid. The pH of the flaky titanate dispersion liquid was 10.5.

Next, a mesh having an opening size of 45 μm was attached to a slurry screener (SS95×250 manufactured by Aco Japan Co., Ltd.), then a solution obtained by diluting the obtained flaky titanate dispersion liquid 2-fold with pure water was allowed to flow at 30 L/hour, and the flaky titanate dispersion liquid on the screen and the flaky titanate dispersion liquid under the screen were each recovered. Next, the mesh was changed to an opening size of 20 μm, the flaky titanate dispersion liquid under the screen obtained through the 45 μm classification was allowed to flow at 20 L/hour, and the flaky titanate dispersion liquid on the screen (expressed as flaky titanate dispersion liquid among sieves) and the flaky titanate dispersion liquid under the screen were each recovered.

The flaky titanate dispersion liquid among sieves, that is, the flaky titanate dispersion liquid classified through an opening size of 20 μm or more and 45 μm or less was centrifuged at 10,000 rpm for 10 minutes to give a flaky titanate cake. Next, pure water was added to the flaky titanate cake, and a slurry having a solid content of 8% was prepared. The slurry was spray-dried using a spray dryer (L-8i manufactured by Ohkawara Kakohki Co., Ltd.) under conditions of an inlet temperature of 190° C. and an outlet temperature of 85° C., thereby giving a flaky titanate powder.

Example 2

A flaky titanate dispersion liquid, a flaky titanate dispersion liquid among sieves, a flaky titanate cake, and a flaky titanate powder were obtained in the same manner as in Example 1, except that the amount of 90% aqueous solution of 2-amino-2-methyl-1-propanol added in Example 1 was changed to 10.7 g per 100 g of $TiO_2$ (which corresponds to 0.15 neutralization equivalents relative to hydrogen ions included in the layered titanate).

Example 3

Ion-exchange was performed in the same manner as in Example 1, except that the amount of 1.1-N aqueous sulfuric acid solution used for ion exchange was adjusted, thereby giving a layered titanate cake. The potassium amount included in the layered titanate cake was analyzed with a X-ray fluorescence spectrometer (RIX2100 manufactured by Rigaku). The result was 3.3% as $K_2O/TiO_2$.

The obtained layered titanate cake was redispersed in pure water to 8.5% in terms of $TiO_2$ conversion to give a layered titanate dispersion liquid. The layered titanate dispersion liquid and aqueous ammonia were mixed to adjust the pH to 8.7. Subsequently, per 100 g of $TiO_2$, 21.4 g of a 90% aqueous solution of 2-amino-2-methyl-1-propanol (which corresponds to 0.3 neutralization equivalents relative to hydrogen ions included in the layered titanate) was added and stirred at room temperature for 1 hour to give a flaky titanate dispersion liquid.

Next, a mesh having an opening size of 10 μm was attached to a slurry screener (SS95×250 manufactured by Aco Japan Co., Ltd.), then a solution obtained by diluting the obtained flaky titanate dispersion liquid 2-fold with pure water was allowed to flow at 18 L/hour, thereby performing classification. As a result, the flaky titanate dispersion liquid on the screen and the flaky titanate dispersion liquid under the screen were each recovered.

The flaky titanate dispersion liquid on the screen was diluted 3-fold with pure water, and separated into a precipitate and a supernatant using a centrifuge (SJ10F manufactured by Mitsubishi Kakoki Kaisha, Ltd.). The sediment resulting from centrifugation (flaky titanate cake) was spray-dried using a spray dryer (L-8i manufactured by Ohkawara Kakohki Co., Ltd.) under conditions of an inlet temperature of 190° C. and an outlet temperature of 85° C., thereby giving a flaky titanate powder.

Comparative Example 1

The flaky titanate dispersion liquid obtained in Example 1 was subjected to centrifugation, slurry preparation, and spray drying in the same manner as in Example 1 except that the classification operation was not performed, thereby giving a flaky titanate cake and a flaky titanate powder.

Comparative Example 2

The flaky titanate dispersion liquid obtained in Example 2 was subjected to centrifugation, slurry preparation, and spray drying in the same manner as in Example 2 except that the classification operation was not performed, thereby giving a flaky titanate cake and a flaky titanate powder.

Comparative Example 3

A flaky titanate dispersion liquid was obtained in the same manner as in Example 1, except that the calcination temperature at the time of synthesizing lithium potassium titanate was changed to 1,100° C., and, as a delaminating agent, 3.5 g of n-propylamine was used per 100 g of $TiO_2$ (which corresponds to 0.08 neutralization equivalents relative to hydrogen ions included in the layered titanate). The flaky titanate dispersion liquid was centrifuged at 10,000 for 10 minutes, and its solid content was recovered, thereby giving a flaky titanate cake.

Measurement of Particle Size Distribution

The particle size distribution of the flaky titanate in the flaky titanate dispersion liquid was measured by using a laser diffraction/scattering particle size distribution analyzer (LA-950 manufactured by HORIBA, Ltd.). The refractive index was set at 2.50. In Examples 1 and 2, the flaky titanate dispersion liquids among sieves after classification were used for measurement, while in Example 3, the flaky titanate dispersion liquid on the screen after classification was used.

Measurements of Carbon Amount and Nitrogen Amount

The flaky titanate cake was dried at 150° C. for 16 hours, and the carbon amount and the nitrogen amount of the resulting sample were analyzed using an elemental analyzer (Vario EL III manufactured by Elementar).

Preparation of Paint 1

1.25 g of each of the flaky titanate powders obtained in Examples 1 and 2 and Comparative Examples 1 and 2, 11.9 g of an acrylic silicone resin blend (solid content: 42%) according to the blending ratio of Table 1, and 9.40 g of pure water were placed in a glass vessel and mixed in a paint shaker for 5 minutes, thereby preparing a paint. With respect to the flaky titanate cake obtained in Comparative Example 3, 1.25 g of the cake in terms of its solid content conversion was weighed, and then 11.9 g of an acrylic silicone resin blend (solid content: 42%) according to the blending ratio of Table 1 and 9.40 g of pure water (including moisture included in the flaky titanate cake) were placed in a glass vessel and mixed in a paint shaker for 5 minutes, thereby preparing a paint. The solid content of the flaky titanate cake was calculated from mass changes before and after drying at 150° C. for 16 hours.

Preparation of Paint 2

5.0 g of each of the flaky titanate powders obtained in Examples 1, 2, and 3 and Comparative Examples 1 and 2 and 11.9 g of an acrylic silicone resin blend (solid content: 42%) according to the blending ratio of Table 1 were placed in a glass vessel and mixed in a paint shaker for 5 minutes, and then pure water was added to make the paint viscosity 200 mPa·s, thereby preparing a paint. With respect to the flaky titanate cake obtained in Comparative Example 3, 5.0 g of the cake in terms of a solid content conversion was weighed, and then 11.9 g of an acrylic silicone resin blend (solid content: 42%) according to the blending ratio of Table 1 was placed in a glass vessel and mixed in a paint shaker for 5 minutes, and pure water was added to make the paint viscosity 200 mPa·s, thereby preparing a paint. The solid content of the flaky titanate cake was calculated from mass changes before and after drying at 150° C. for 16 hours.

TABLE 1

| Material | Product Name | Blending Ratio (part by mass) |
| --- | --- | --- |
| Acrylic silicone resin | Pegar 896 (manufactured by Koatsu Gas Kogyo Co., Ltd.) | 76 |
| Film-forming aid | Texanol (manufactured by Eastman Chemical Co.) | 2.9 |
| Defoamer | BYK-024 (manufactured by BYK-Chemie GmbH) | 0.25 |
| Urethane associative thickener | SN Thickener 619N (manufactured by Sannopuko, K.K.) | 0.20 |

TABLE 1-continued

| Material | Product Name | Blending Ratio (part by mass) |
| --- | --- | --- |
| Alkali thickener | Primal ASE-60 (manufactured by Dow Chemical Co.) | 0.25 |
| Water | | 18.5 |

Preparation of Paint Film for Luster Evaluation 1

A paint prepared by the method of "Preparation of Paint 1" described above was applied onto a PET film (Lumirror T60 manufactured by Toray Industries, Inc.) using a 3 mil doctor blade and forcedly dried at 60° C. for 30 minutes, thereby preparing a paint film for luster evaluation. In addition, paint films using commercially available pearl mica (Iriodin 6103 or Iriodin 6111 manufactured by Merck) as a luster pigment were also prepared according to the same formulation. Each of them was defined as Reference Examples 1 and 2, and used as evaluation standards for the 3-grade visual evaluation of luster feeling, dense feeling, and particle feeling described below.

Preparation of Paint Film for Luster Evaluation 2

A paint prepared by the method of "Preparation of Paint 2" described above was applied onto a PET film (Lumirror T60 manufactured by Toray Industries, Inc.) using a spray gun and forcedly dried at 60° C. for 30 minutes, thereby preparing a paint film having a film thickness of 10 μm.

Evaluation of Shading Feeling 1

The black ground of a black-and-white chart was applied to the back side of a paint film prepared by the method of "Preparation of Paint Film for Luster Evaluation 1" described above. By using a goniospectrophotometric color measurement system (Model GCMS-3 manufactured by Murakami Color Research Laboratory Co., Ltd.), a light source was irradiated from a direction of −45°, and the $L^*$ values of the highlights (light-receiving angle 40° and light-receiving angle 50°) and the shade (light-receiving angle −65°) were measured. The $L^*$ of the shade was subtracted from the maximum highlight $L^*$ to calculate $\Delta L^*_1$, and the shading feeling was evaluated.

Evaluation of Shading Feeling 2

The white ground of a black-and-white chart was applied to the back side of a paint film prepared by the method of "Preparation of Paint Film for Luster Evaluation 2" described above. By using a multi-angle colorimeter (BYK-mac i manufactured by BYK-Gardner), a light source was irradiated from a direction of −45°, and the $L^*$ values of the highlight (light-receiving angle 30°) and the shade (light-receiving angle −65°) were measured. The $L^*$ of the shade was subtracted from the $L^*$ of the highlight to calculate $\Delta L^*_2$, and the shading feeling was evaluated.

Evaluation of Luster Feeling

The luster feeling of the prepared paint film was visually evaluated. The luster feeling is an index that indicates the degree of metallic brightness that a paint film has, and was scored on a 3-grade scale from 1 (high) to 3 (low).

Evaluation of Silky Feeling (Dense Feeling, Particle Feeling)

The silky feeling of the prepared paint film was visually evaluated. As silky feeling indexes, two of dense feeling and particle feeling were employed. The dense feeling refers to a silk-like seamless and smooth design, and was scored on a 3-grade scale from 1 (high) to 3 (low). The particle feeling refers to a design that appears as if each of the particles independently glitters, and was scored on a 3-grade scale in which a case giving no particle feeling is evaluated as 1 and a case giving strong glittering feeling as 3.

Measurement of Particle Thickness

A paint film prepared for luster evaluation was cut with a microtome, and the cross-section was observed under a scanning electron microscope (S-4800 manufactured by Hitachi High-Technologies Corporation). The thicknesses of 50 flaky titanate particles observed were measured, and their average was defined as the thickness of flaky titanate particles.

Preparation of Paint Film for Weather Resistance Evaluation

The above paint was applied onto a dull steel plate using a bar coater No. 60 and forcedly dried at 60° C. for 30 minutes to form a luster paint film. Next, a commercially available base compound and curing agent for a two-pack curable urethane resin paint were mixed to prepare a topcoat paint. The paint was applied onto the above luster paint film using a bar coater No. 60, forcedly dried at 80° C. for 30 minutes to form a topcoat, thereby giving a paint film for weather resistance evaluation.

Evaluation of Weather Resistance

The L-, a-, and b-values on Hunter colorimetric system of a paint film were measured using a spectrophotometer (SD 5000 manufactured by Nippon Denshoku Industries Co., Ltd.). The weather resistance of a paint film was evaluated through an accelerated exposure test. The test was performed using a sunshine weather meter (Model WEL-SUN-HC manufactured by Suga Test Instruments Co., Ltd.) under the following conditions: black panel temperature of 63±3° C.; light source of carbon arc lamp; and shower spraying of 12 minutes out of 1 hour. The L-, a-, and b-values were measured every certain period of time by the same method as above. From the L-, a-, and b-values after 300 hours from the accelerated exposure and the L-, a-, and b-values before the accelerated exposure test, a color difference $\Delta E$ was calculated. Calculation was performed as follows: $\Delta E = [(\Delta L)^2 + (\Delta a)^2 + (\Delta b)^2]^{1/2}$.

Analysis of Cs Content

A flaky titanate powder was analyzed using a X-ray fluorescence spectrometer (RIX2100 manufactured by Rigaku Co.) to determine the Cs content.

The particle size distribution measurement results of the examples and the comparative examples are shown in Table 2. The results of the evaluation of $\Delta L^*_1$ (and $\Delta L^*_2$), luster feeling, and silky feeling are shown in Table 3. The thickness of the flaky titanate particles of Example 1 was 0.1 μm, the thickness of the flaky titanate particles of Comparative Example 1 was 0.1 μm, and the thickness of the flaky titanate particles of Comparative Example 3 was 0.7 μm. The Cs amount of the flaky titanate powder obtained in Example 1 was the detection limit (0.01 mass %) or less.

TABLE 2

| | D10 (μm) | D50 (μm) | D90 (μm) | (D90 − D10)/D50 | D99 (μm) |
|---|---|---|---|---|---|
| Example 1 | 12.8 | 26.7 | 52.5 | 1.49 | 76.7 |
| Example 2 | 13.6 | 25.4 | 43.9 | 1.19 | 69.1 |
| Example 3 | 15.7 | 33.0 | 61.0 | 1.38 | 100.4 |
| Comparative Example 1 | 16.6 | 38.0 | 76.2 | 1.57 | 137 |
| Comparative Example 2 | 18.2 | 43.5 | 86.7 | 1.57 | 151 |
| Comparative Example 3 | 10.5 | 20.0 | 43.5 | 1.65 | 77.1 |

TABLE 3

| | $\Delta L^*_1$ | $\Delta L^*_2$ | Luster feeling | Silky feeling Dense feeling | Silky feeling Particle feeling |
|---|---|---|---|---|---|
| Example 1 | 172 | 69 | 1 | 1 | 1 |
| Example 2 | 170 | 64 | 1 | 1 | 1 |
| Example 3 | — | 66 | 1 | 1 | 1 |
| Comparative Example 1 | 175 | 73 | 1 | 2 | 2 |
| Comparative Example 2 | 175 | 69 | 1 | 3 | 3 |
| Comparative Example 3 | 126 | 30 | 3 | 3 | 1 |
| Reference Example 1 | 166 | 54 | 1 | 3 | 3 |
| Reference Example 2 | 130 | 31 | 3 | 1 | 1 |

The samples of Examples 1 and 2 and Comparative Examples 1 and 2 all have a $\Delta L^*_1$ of 150 or more ($\Delta L^*_2$ of 60 or more) and have a shading feeling and a luster feeling. However, the silky feeling was more excellent in Examples 1 to 3 where (D90−D10)/D50 was adjusted to 1.5 or less by a classification operation than in Comparative Examples 1 and 2. In Comparative Example 3, $\Delta L^*_1$ (and $\Delta L^*_2$) was low, and both the shading feeling and the luster feeling were poor. In addition, as a result of visual observation, its silky feeling was lowest. As shown in the reference examples, there is no commercially available pearl mica capable of achieving both a luster feeling and a silky feeling. However, it can be seen that the flaky titanates of Examples 1 to 3 each exhibit a unique design feeling that has a high dense feeling and almost no particle feeling, while having a luster feeling and a shading feeling.

Table 4 shows the carbon amount, basic functional group content, nitrogen amount, and weather resistance ($\Delta E$) of each sample. The basic functional group content (%) in Example 1 using 2-amino-2-methyl-1-propanol as a delaminating agent was calculated according to the following general formula: (the number of basic functional groups per one molecule of the basic organic compound)×(carbon amount (mass %))/{(atomic weight of carbon×the number of carbon atoms per one compound)/(formula weight of $TiO_2$)}, and thus was calculated as 1×(0.910)/{(12.0×4)/79.9}=1.51%. The basic functional group content (%) in Comparative Example 3 using n-propylamine as a delaminating agent was calculated according to the following general formula: (the number of basic functional groups per one molecule of the basic organic compound)×{(carbon amount (mass %))/(atomic weight of carbon×the number of carbon atoms per one compound}/(formula weight of $TiO_2$), and thus was calculated as 1×(1.11)/{(12.0×3)/79.9}=2.46%.

TABLE 4

| | Carbon amount (%) | Basic functional group content (%) | Nitrogen amount (%) | ΔE |
|---|---|---|---|---|
| Example 1 | 0.910 | 1.51 | 3.34 | 1.03 |
| Example 2 | 0.775 | 1.29 | 3.64 | 1.06 |
| Example 3 | 1.22 | 2.04 | 2.69 | 1.00 |
| Comparative Example 1 | 3.42 | 5.69 | 3.50 | 1.55 |
| Comparative Example 2 | 3.47 | 5.78 | 3.29 | 1.56 |
| Comparative Example 3 | 1.11 | 2.46 | 3.38 | 1.57 |

In Examples 1 to 3, the basic functional group content was reduced to 2.4% or less as a result of the classification operation, ΔE was lower as compared with the comparative examples, and the weather resistance was improved. In all the comparative examples, the basic functional group content was more than 2.4%, and the weather resistance was insufficient.

INDUSTRIAL APPLICABILITY

The present invention can provide a flaky titanate that is capable of giving a silky feeling with a strong luster feeling and a shading feeling to a paint film and at the same time exhibits high weather resistance; and a method for producing the same, which is inexpensive and suitable for industrial production. In addition, the present invention can give an even higher silky feeling with a further increased dense feeling and a reduced particle feeling to a paint film. Therefore, the flaky titanate of the present invention is suitable as a luster pigment, and can be used as one blended in a paint composition, an ink composition, a plastic resin composition, or the like. As a result, an article having a unique design feeling unavailable so far can be put to practical use.

The invention claimed is:

1. A flaky titanate having (D90−D10)/D50 of 1.5 or less in a volume particle size distribution measured by a laser diffraction/scattering method,
wherein the D10, D50, and D90 express a cumulative 10% particle size, a median size, and a cumulative 90% particle size, respectively, and the D10 is 9 μm or more and wherein the flaky titanate comprises a basic organic compound and having a basic functional group content of 2.4% or less.

2. The flaky titanate according to claim 1, wherein D10 is 10 μm or more.

3. The flaky titanate according to claim 1, wherein D90 is 65 μm or less.

4. The flaky titanate according to claim 1, wherein D90 is 55 μm or less.

5. The flaky titanate according to claim 1, wherein D50 is 10 to 40 μm.

6. The flaky titanate according to claim 1, wherein D50 is 10 to 30 μm.

7. A method for producing a flaky titanate according to claim 1, comprising a step of classifying a flaky titanate having a basic organic compound between layers and/or on a surface thereof, thereby adjusting (D90−D10)/D50 in a volume particle size distribution to be 1.5 or less.

8. The method according to claim 7, further comprising a step of allowing a flaky titanate having a basic organic compound between layers and/or on a surface thereof to exist in an aqueous medium with a pH of 6 or more and less than 10.

9. A method for producing a flaky titanate according to claim 1, comprising a step of performing delamination between layers of a layered titanate with a basic organic compound, wherein the layered titanate has (D90−D10)/D50 of 1.5 or less in a volume particle size distribution.

10. A method for producing a flaky titanate according to claim 1, comprising the steps of:
obtaining a layered titanate by bringing a metal titanate into contact with an acid compound wherein the metal titanate has (D90−D10)/D50 of 1.5 or less in a volume particle size distribution; and
performing delamination between layers of the layered titanate with a basic organic compound.

11. A luster pigment comprising the flaky titanate according to claim 1.

12. A dispersion liquid comprising at least the flaky titanate according to claim 1 and a dispersion medium.

13. A resin composition comprising at least the flaky titanate according to claim 1 and a resin.

14. A paint composition comprising at least the flaky titanate according to claim 1 and a resin.

15. A plastic resin composition comprising at least the flaky titanate according to claim 1 and a plastic resin.

16. An ink composition comprising at least the flaky titanate according to claim 1, a resin, and a solvent.

* * * * *